(12) United States Patent
Zorin et al.

(10) Patent No.: US 12,248,810 B2
(45) Date of Patent: Mar. 11, 2025

(54) AUTOMATICALLY ORCHESTRATING A COMPUTERIZED WORKFLOW

(71) Applicant: INTERNATIONAL BUSINESS MACHINES CORPORATION, Armonk, NY (US)

(72) Inventors: Anton Zorin, Wädenswil (CH); Manish Kesarwani, Bengaluru (IN); Niels Dominic Pardon, Zürich (CH); Ritesh Kumar Gupta, Hyderabad (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 17/840,698

(22) Filed: Jun. 15, 2022

(65) Prior Publication Data
US 2023/0409386 A1 Dec. 21, 2023

(51) Int. Cl.
*G06F 9/48* (2006.01)
*G06N 7/01* (2023.01)

(52) U.S. Cl.
CPC .......... *G06F 9/4881* (2013.01); *G06F 9/4856* (2013.01); *G06N 7/01* (2023.01)

(58) Field of Classification Search
CPC ...... G06F 9/4881; G06F 9/4856; G06F 9/485; G06F 9/542; G06F 9/5038; G06N 7/01; G06Q 10/0633
See application file for complete search history.

(56) References Cited

U.S. PATENT DOCUMENTS 9,223,628 B2 12/2015 Rastogi
9,684,502 B2 6/2017 Fu
(Continued)

FOREIGN PATENT DOCUMENTS

CN 101421729 A 4/2009
CN 112379995 A 2/2021
(Continued)

OTHER PUBLICATIONS

"Adapter for Apache Airflow", © 2021 Tidal Software LLC • All Rights Reserved, 3 pps., <https://www.tidalsoftware.com/integrations/developer/apache-airflow/>.
(Continued)

*Primary Examiner* — Brian W Wathen
(74) *Attorney, Agent, or Firm* — Aaron N. Pontikos

(57) ABSTRACT

The method performs at the orchestration interface at which update information, including changes to tasks of a workflow, is received from a task manager system (TMS), where the workflow includes a set of tasks, inputs to the tasks, and outputs from the tasks. The inputs and outputs determine runtime dependencies between the tasks. Based on the update information received, the orchestration interface populates a topology of nodes and edges as a directed acyclic graph (DAG) that maps nodes to tasks and edges to runtime dependencies between tasks, based on node inputs and outputs. The orchestration interface instructs the execution of the tasks and handling dependencies by interacting with a task execution system (TES) and by traversing the DAG, the orchestration interface identifies tasks that depend on completed tasks as per the runtime dependencies and instructs the TES to execute the dependent tasks identified.

20 Claims, 7 Drawing Sheets

(56) References Cited

U.S. PATENT DOCUMENTS

| | | |
|---|---|---|
| 10,372,492 B2 | 8/2019 | Kishore |
| 2015/0026691 A1* | 1/2015 | Rastogi ................. G06F 9/4881 718/102 |
| 2015/0160974 A1* | 6/2015 | Kishore ................ G06F 9/4881 718/106 |
| 2018/0064904 A1 | 3/2018 | Vargas |
| 2019/0004864 A1* | 1/2019 | Papageorgiou ....... G06F 9/5066 |
| 2020/0272433 A1* | 8/2020 | Wang ........................ G06F 8/30 |
| 2021/0208953 A1* | 7/2021 | Vasileiadis ............ G06F 9/4881 |
| 2021/0224122 A1 | 7/2021 | Glass |

FOREIGN PATENT DOCUMENTS

| | | |
|---|---|---|
| CN | 113094164 A | 7/2021 |
| CN | 113168347 A | 7/2021 |
| CN | 108140031 A | 5/2022 |
| WO | 2021/135545 A1 | 7/2021 |

OTHER PUBLICATIONS

"Automating infrastructure with Cloud Composer", Last updated Sep. 3, 2021 UTC, 37 pps., <https://cloud.google.com/architecture/automating-infrastructure-using-cloud-composer>.

International Search Report and Written Opinion dated Jun. 30, 2023 from International Application No. PCT/IB2023/054583 filed May 3, 2023, 7 pps.

\* cited by examiner

AUTOMATICALLY ORCHESTRATING A COMPUTERIZED WORKFLOW

BACKGROUND

The present invention relates in general to the field of computerized workflows, and in particular to automatically generating computerized workflows using an orchestration interface.

A workflow task manager system (TMS) can receive manual input regarding changes to a workflow that can produce changes to dependencies among tasks of the workflow.

Orchestration is used in several areas, such as for compilation, data workflow management, and business process management. The level of automation of orchestration used depends on the specific area and application. For example, orchestrating tasks in data transformation workflows may require numerous user interactions, which renders the orchestration process essentially "manual" in most cases. In particular, to attain an "in sync" condition with orchestration workflows, tasks meant to be subsequently run are often manually synchronized. Additionally, due to interdependencies of orchestration workflows, changes in one workflow may potentially break the consistency of other workflows.

SUMMARY

According to a first aspect, the present invention is embodied as a computer-implemented method of automatically orchestrating a computerized workflow with an orchestration interface. The method is performed at the orchestration interface. The orchestration interface receives update information from a task manager system (TMS). The update information captures changes to a workflow of tasks managed by the TMS, where the workflow is defined by processes included in a set of tasks, inputs to the tasks, and outputs from the tasks. The inputs and outputs determine runtime dependencies between the set of tasks (hereafter, "the tasks"). Based on the update information received, the orchestration interface obtains and populates a topology of nodes and edges as a directed acyclic graph (DAG). The nodes are mapped onto the tasks managed by the TMS, while the edges capture the runtime dependencies between the tasks, which include the inputs to the tasks and the outputs from the tasks. The orchestration interface subsequently orchestrates the execution of the tasks by interacting with a task execution system (TES), while suitably handling dependencies. The orchestration interface iteratively identifies dependent tasks that depend on already completed tasks as per the runtime dependencies by traversing the DAG and determining the status of each node and the dependencies to and from respective nodes and, accordingly, instructs the TES to execute the dependent tasks identified.

According to another aspect, the invention is embodied as a computer program product for automatically orchestrating a computerized workflow. The program instructions are executable by one or more computer processors to cause the latter to perform steps according to the above method.

According to a further aspect, the invention is embodied as a computerized system for automatically orchestrating a computerized workflow. The system comprises a first interface means, a second interface means, a reception module, a topological analysis module, and an orchestration module. The first interface means can be interfaced with a TMS. The reception module is configured to receive update information via the first interface means. In operation, the update information captures changes to a workflow of tasks managed by the TMS. The workflow is defined by processes of the tasks, inputs to the tasks, and outputs from the tasks, and the inputs and outputs determine runtime dependencies between the tasks. The topological analysis module is configured to obtain a topology of nodes and edges as a DAG, based on the update information received. As described in the above method, the nodes of the DAG are mapped onto the tasks managed by the TMS, and the edges capture the runtime dependencies between the tasks, based on the inputs and outputs. The second interface means can be interfaced with a TES. The orchestration module is configured to orchestrate the execution of the tasks by interacting with the TES via the second interface means. In operation, embodiments: (i) iteratively identify dependent tasks that depend on already completed tasks as per the runtime dependencies, by exploring the DAG, and (ii) instruct the TES to execute the dependent tasks identified. The computerized system may include the TMS and/or the TES.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of devices or parts thereof, as involved in embodiments. Similar or functionally similar elements in the figures have been allocated the same numeral references, unless otherwise indicated.

DETAILED DESCRIPTION

Computerized systems, methods, and computer program products embodying the present invention will now be described, by way of non-limiting examples.

The following description is structured as follows. General embodiments and high-level variants are described in section 1. Section 2 addresses particularly preferred embodiments, including preferred flows such as shown in FIGS. 3-6. Section 3 concerns technical implementation details.

The present method and its variants are collectively referred to as the "present methods". All references presented in the format of "Sn" refer to methods steps of the flowcharts of FIGS. 3-6, while numeral references pertain to devices, components, and concepts involved in embodiments of the present invention.

1. GENERAL EMBODIMENTS AND HIGH-LEVEL VARIANTS

Figure 1:
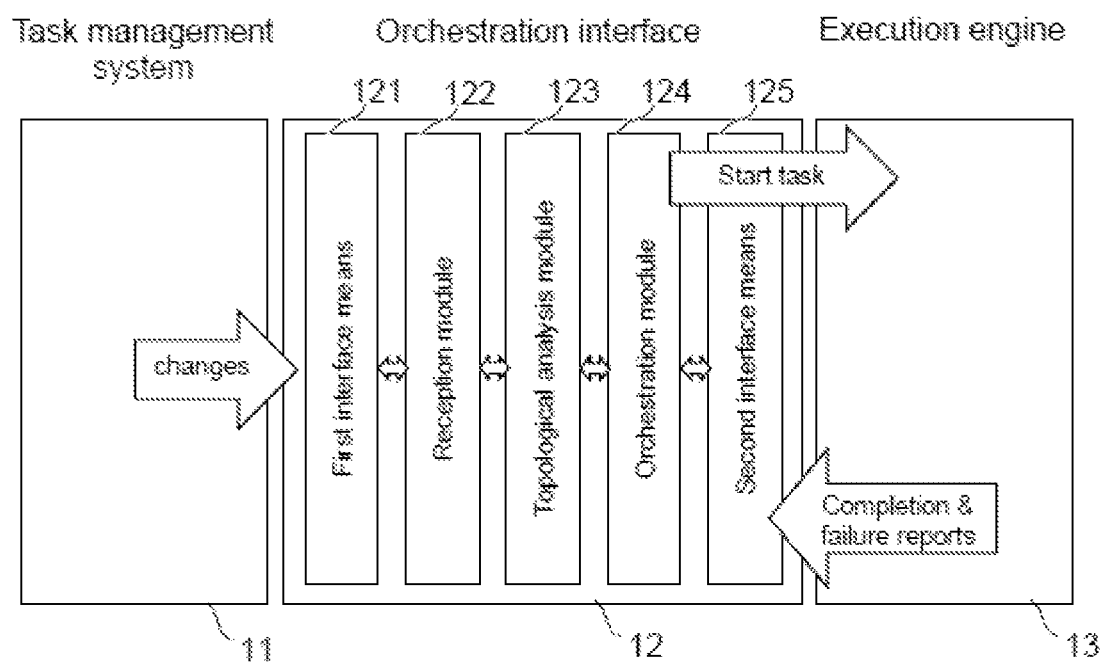
FIG. 1 is a high-level diagram schematically illustrating components of a computerized system for automatically orchestrating a computerized workflow, in accordance with an embodiment of the present invention.
Figure 2:
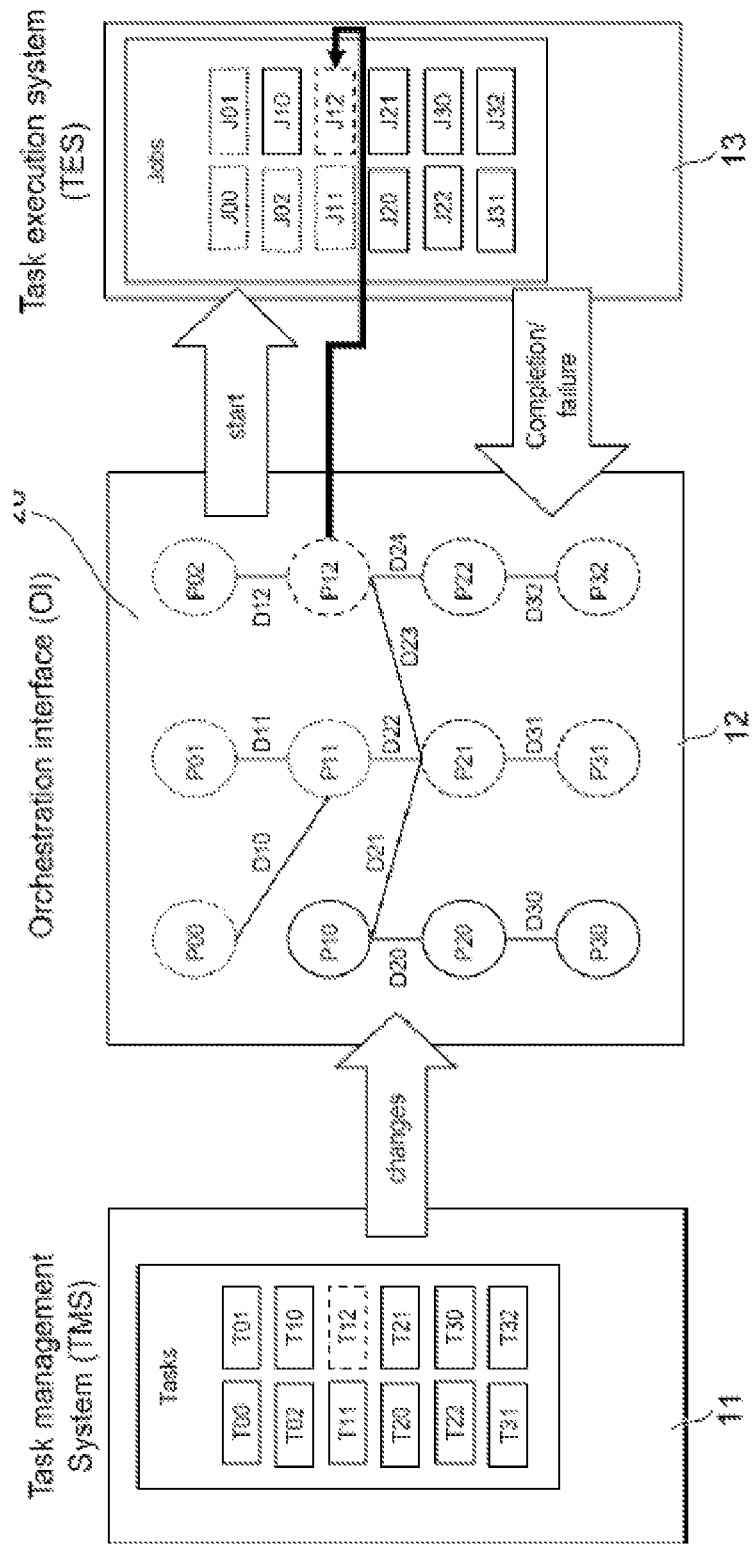
FIG. 2 is a diagram further illustrating the orchestration interface and a topology of nodes and edges as a directed acyclic graph (DAG), in accordance with an embodiment of the present invention.

A first aspect of the invention is now described in reference to FIGS. 1, 2, 4, and 6. The first aspect concerns computer-implemented methods of automatically orchestrating a computerized workflow with an orchestration interface 12, which is illustrated in FIGS. 1 and 2. The present methods are primarily implemented at the orchestration interface 12, hereafter abbreviated as "OI". The following steps reflect actions performed at the OI 12.

In practice, the OI 12 interacts with both a task manager system (TMS) 11 and a task execution system (TES) 13, as illustrated in FIGS. 1 and 2. Thus, the orchestration interface 12 must be interfaced with both the TMS 11 and the TES 13, as illustrated in FIG. 1. The components TMS 11, OI 12, and TES 13 typically communicate via a network. In practice, the OI 12 may need to be first interfaced with the TMS 11 and then with the TES 13 to initially synchronize with the tasks and dependencies of the workflow. The OI 12 can be implemented as a computerized system 1, which concerns another aspect of the invention and is described later in detail.

Figure 4:
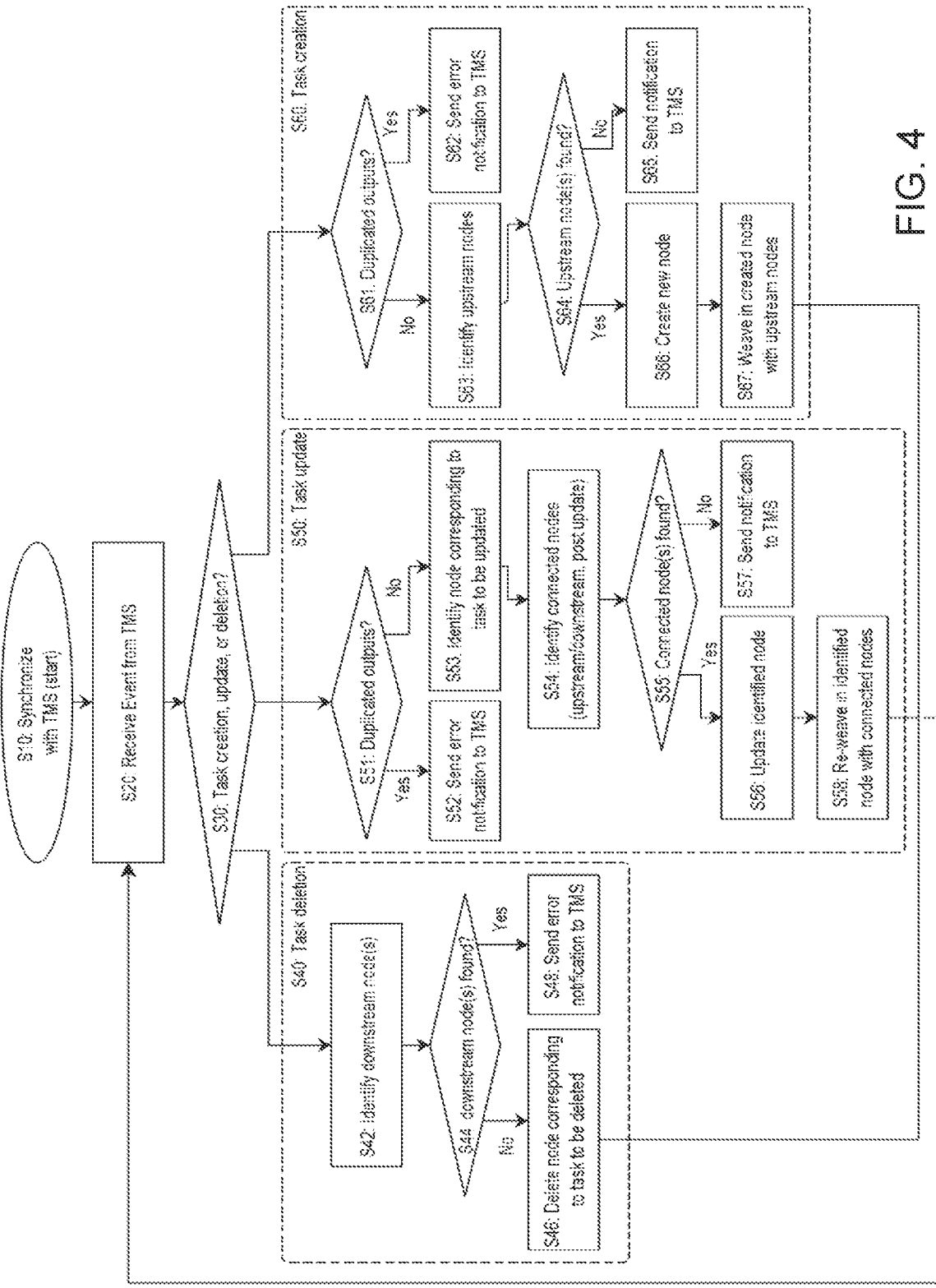
FIG. 4 illustrates steps performed by an orchestration interface in response to inputs received from the task manager system (TMS), in accordance with an embodiment of the present invention.

According to the present methods, the OI 12 receives data from the TMS 11, which corresponding to step S20 in FIG. 4. The data received at step S20 include update information from the TMS 11. Users typically interact with the TMS 11, so as to define tasks and changes to the tasks to be performed. In turn, the TMS 11 transmits corresponding information to the OI 12. The update information captures changes to a workflow of tasks managed by the TMS 11. The workflow is defined by processes of the tasks, as well as inputs to the tasks and outputs from the tasks. The task inputs and outputs determine runtime dependencies between the tasks. In practice, the TMS 11 may continually send update information to the OI 12, depending on timing and frequency of user inputs.

The OI 12 determines and populates a topology of nodes and edges, based on the update information previously received, as depicted in steps S40-S60 of FIG. 4. A topology of nodes and edges includes synchronizing an initial set of tasks and task dependencies with TMS 11 and updating the topology with subsequent changes consistent with the update information received. The topology reflects the current state of nodes and edges that correspond to the current state of tasks, task status, and dependencies of the workflow managed by TMS 11. The nodes are correspondingly mapped to the tasks managed by the TMS 11, while the edges capture the runtime dependencies between the tasks, in accordance with the inputs to the tasks and outputs from the tasks. The topology of nodes and edges, as determined, assumes the form of a directed acyclic graph (DAG) 20. The topology of the DAG 20 corresponds to a data flow, such that the data is meant to be produced, consumed, and/or transformed by the tasks mapped onto the nodes of the DAG 20. Beyond the tasks and their runtime dependencies, the DAG 20 may further be used to maintain runtime status information about tasks being executed by the TES 13, as will be discussed below.

The update information received from the TMS 11 captures all changes with respect to a previous state of the workflow. In practice, the OI 12 may gradually receive update information, whereby the DAG 20 is gradually updated by the OI 12. However, the OI 12 may also start from an empty workflow and, correspondingly, from an empty DAG 20. In the latter case, the initial data may be loaded in bulk. Once an initial DAG 20 is populated, the OI 12 can progressively update the DAG 20 based on update information that is gradually transmitted by the TMS 11. In both cases, the DAG 20 is being populated by the OI 12 based on data received from the TMS 11.

Figure 6:
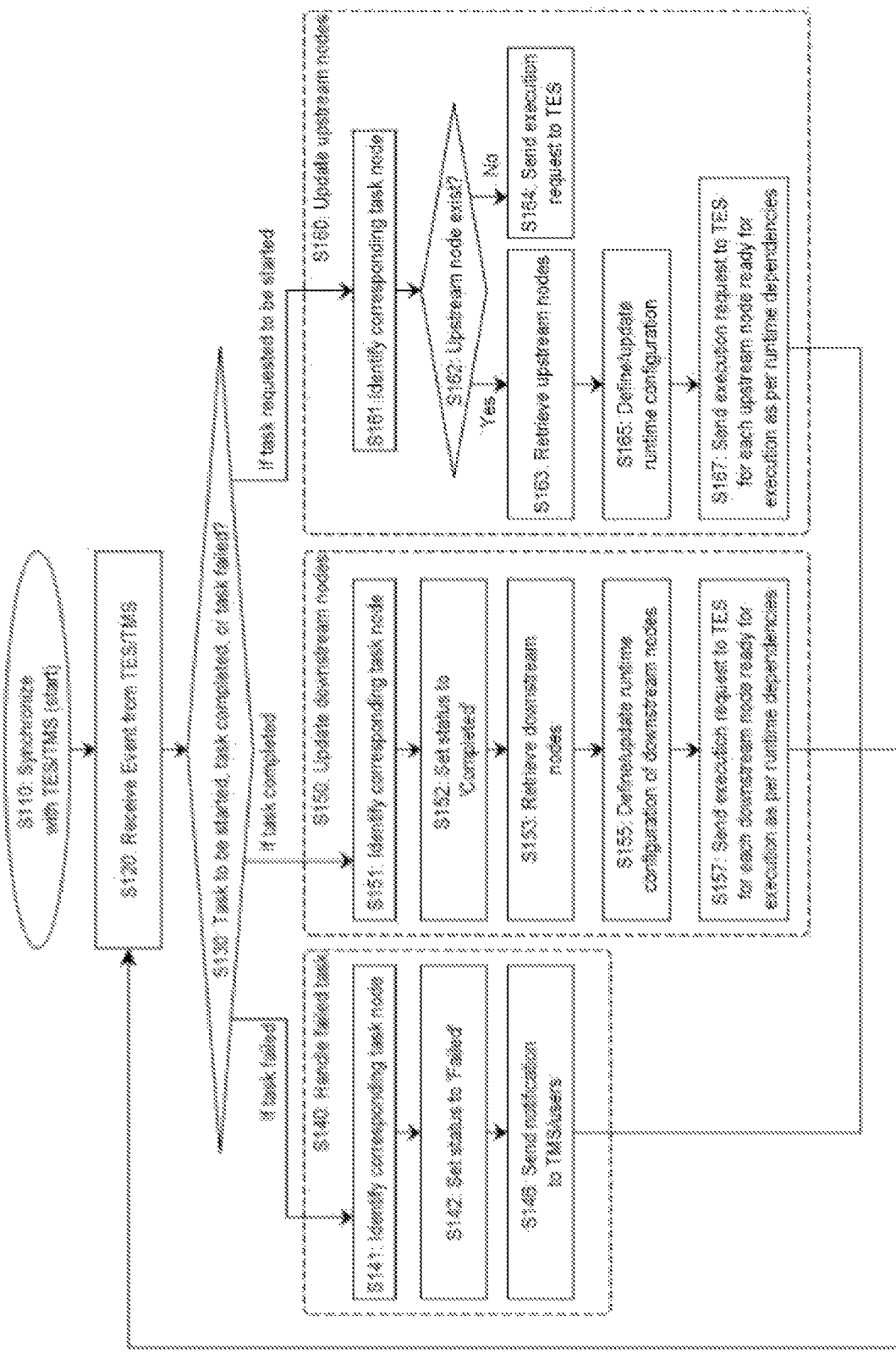
FIG. 6 illustrates steps interacting with the task execution system (TES) to orchestrate the execution of tasks.

Subsequent to populating the DAG 20 with updated information (i.e., updated topology), the OI 12 can orchestrate the execution of the tasks by interacting with the TES 13, as indicated in the high-level steps S150 and S160 of FIG. 6. Orchestration performed by the orchestration interface includes receiving workflow information updates, transferring the updates to be reflected in a topology of the DAG, traversing the DAG to iteratively identify tasks that depend on completed tasks and instructing the TES 13 to execute the identified dependent tasks. The received workflow information updates include changes to tasks, task status, and task dependencies from a previous state of the workflow. The orchestration execution by OI 12 is achieved by iteratively identifying dependent tasks as a result of exploring (i.e., traversing) the DAG 20 (i.e., FIG. 6, step S153). The OI 12 iteratively identifies tasks that depend on completed tasks, such as the runtime dependencies captured by the edges of the DAG. Based on the identified runtime dependencies, the OI 12 can adequately instruct the TES 13 to execute the dependent tasks identified by the respective runtime dependencies.

Stated alternatively, the OI 12 orchestrates the execution of the tasks by iteratively interacting with the TES 13. The OI 12 does not need to include the code embodying the processes of the tasks themselves, but instead exchanges messages with the TES 13 that include information indicating when a task needs to be started. Subsequent to processing a task, the TES may send messages as to the completion status of the tasks (step S240). Similarly, the OI 12 receives messages from the TMS 11, which capture information as to the changes made to the workflow. The messages received from the TMS 11 may concern the processes corresponding to the tasks and/or changes in terms of dependencies between the tasks. The OI 12 may also send messages to the TMS 11, as a result of detecting an inconsistency, as explained further below.

The present orchestration methods enable a fully automated orchestration of tasks, such that user only need to initially define or update their tasks at the TMS 11. In addition, the proposed orchestration methods help identify and prevent changes that may break the orchestration logic consistency. In addition to providing automatic orchestrations, embodiments of the present invention can also be used for consistency enforcement, analysis, and prediction of current and future workloads. Some embodiments may be adapted to further detect orphan tasks, which are tasks that do not depend on any other tasks.

Details of particular embodiments of the present invention are presented. The present methods may cause new nodes to be inserted in the DAG, in accordance with information received from the TMS 11. For instance, as illustrated in FIG. 4, the OI 12 may receive update information requesting the creation of a new task corresponding to a task creation request performed at step S30. Subsequently, the OI 12 will weave in a new node in the DAG 20 (steps S66, S67), unless an issue is detected. The new node will be inserted to obtain an updated topology of the DAG. The new node corresponds to the new task to be created as per the update information received, and the new node corresponds to a new process, which, upon execution, may take inputs from upstream nodes in the DAG. In addition, the new process may produce outputs to be consumed by downstream nodes, stored, or returned to an entity (e.g., the user, the TMS 11, and/or the OI 12).

Aside from task creations, the OI 12 may receive update information requesting a change to an existing task (i.e., corresponding to a request at step S30). The requested change may concern the process associated with the task, the inputs to this task, and/or the outputs from this task. The OI 12 will re-weave in an existing node in the DAG 20 (see step S58), unless an issue is detected. This node corresponds to an updated task as per the update information received from the TMS 11. The updated node is reflected in an updated topology in the DAG 20.

Another type of request may concern a task deletion (corresponding to FIG. 4, step S30). For the case of a task deletion, the requested change received at step S20 from the TMS 11 as updated information concerns the deletion of an existing task. This may cause the OI 12 to delete a corresponding node from the DAG 20 (FIG. 4, step S46), unless an incompatible dependency is detected, as explained below.

In each of the three scenarios evoked above (task creation, update, or deletion), the OI 12 operates to attain or maintain a topology for the DAG 20. To achieve an accurate topology for the DAG 20, the OI 12 may check the runtime dependencies of the tasks to be modified, based on inputs and outputs of such tasks, with a focus to detect potential inconsistencies in the runtime dependencies. The OI 12 makes use of information contained in the update information transmitted by the TMS 11 and explores the DAG 20 to check whether the modifications incurred in terms of outputs and inputs are consistent. The inputs and outputs associated with the runtime dependencies being checked by the OI 12 must correspond to the future state of the DAG 20, (i.e., the DAG 20 topology after including the update). Stated alternatively, the topology of edges and nodes composing the future-state DAG are checked for consistency.

When a new task is to be created or updated, the OI 12 may check for potential duplicated outputs, as represented in steps S51 and S61 of FIG. 4. The OI 12 checks for potential duplicated outputs of any new task to be created or any existing task to be updated, as per the request received at step S20. The OI 12 performs the checks based on inputs to the tasks and output from the tasks of the workflow, making use of information contained in the update information, and the update information may also contain information as to the unchanged tasks. In some embodiments, the update information only contains information as to the changed tasks and the impacted tasks, (e.g., as a delta file). In all cases of task update or creation, the OI 12 may need to access information of all nodes and edges, including the unchanged nodes and edges, (e.g., from a local copy at the OI 12 or from the TMS), to check the global consistency of the DAG 20.

In practice, different types of tasks can be involved, which may lead to different types of outputs. Some outputs may be derived inputs. For example, an output of a task can be a table created as a result of processing some input tables, (e.g., by way of union or aggregation). In such a case, a duplication of the outputs would be incorrect because the duplication would cause a consistency violation, which is detected by the OI 12. In other cases, the intended outputs may not be derivatives of inputs. For example, a task may update just a few rows in a target output table. In such a case, duplicated outputs are possible. Thus, certain types of outputs can be duplicated, as per the design of the tasks, whereas other types of duplicated outputs must be avoided to avoid a consistency violation. The latter type of duplicated outputs is also referred to, herein, as illegal duplicated outputs. Whether duplicated outputs must be identified as illegal outputs or not depends on the logic of the workflow. The detection of problematic outputs can be controlled by configuration settings. In some embodiments, the OI 12 may rely on a set of rules to detect such consistency violations.

The OI 12 will preferably notify the TMS 11 (FIG. 4, steps S52 and S62), upon detecting any inconsistency in the runtime dependencies during checks performed at steps S51 and S61. The detection of inconsistencies may cause the TMS 11 to perform additional steps. For example, the TMS 11 may prompt a user to take steps to solve a detected inconsistency. Upon receiving a response from the user, the TMS may subsequently send an updated request to the OI 12 (FIG. 4, step S20), in which case the updated request includes the revised task update. More generally, if an inconsistency is detected by the OI 12, which typically indicates a broken dependency on the TMS 11 side, then the TMS 11 starts a restorative process to resolve the inconsistency. Subsequent to resolving the inconsistency, the TMS 11 sends a new update request to the OI 12. In some embodiments, other entities (e.g., users, the TES 13) could be notified upon detection of an inconsistency, with a focus on remedying the detected inconsistency, and to achieve a topology of the DAG.

As seen in FIG. 4, the task creation and task update requests are handled by the OI 12 as an iterative process, with the intent of creating and maintaining a topology. This iterative process is performed after checking for potential duplicated outputs, in the interest of efficiency, as assumed in FIG. 4.

In particular, for cases of creating a new task, the OI 12 may attempt to identify upstream tasks (steps S63 and S64), on which the new task depends, (i.e., tasks that are upstream of the task to be created as per the logic flow of the task). The dependency determination is achieved by assessing inputs to the new task in which such inputs correspond to outputs of upstream tasks, which the OI 12 identifies by exploring the DAG 20. Subsequent to determining the upstream dependencies on which the new task depends, the OI 12 can weave in a new node corresponding to the new task in the DAG 20 (FIG. 4, steps S66 and S67), should no inconsistency be detected. The new node is inserted in accordance with outputs from the upstream tasks identified.

It should be noted that the flow shown in FIG. 4 assumes that the DAG 20 was already consistent before inserting the new node. The consistent DAG 20 means that there are no existing downstream tasks for the new node, otherwise the corresponding downstream dependency would have led to an inconsistency, which would have been detected earlier. As such, FIG. 4 assumes that a new node is inserted as a leaf node. The same applies in cases in which multiple tasks are simultaneously added. The multiple tasks must be consistent with each other. However, the tasks already encoded in the DAG 20 cannot depend on the inserted tasks, although more sophisticated scenarios can be contemplated, in which an intermediate task is to be inserted. Such scenarios can notably be handled by first deleting all downstream tasks concerned and then re-introducing them, but only after having inserted the intermediate task.

For cases in which a task is to be updated, the OI 12 may attempt to identify an upstream or downstream task that is potentially impacted by the update. For cases in which an existing task is to be updated as per the update information received, the OI 12 may first attempt to identify upstream tasks (FIG. 4, steps S54 and S55), on which the existing task depends, by assessing inputs to the existing task to be updated. Subsequently, the OI 12 will reweave in the node corresponding to the task to be updated (steps S56 and S58), in accordance with the upstream tasks identified. A similar process can be implemented for downstream nodes in which the OI 12 attempts to identify dependent downstream tasks by assessing outputs from the task to be updated. The OI 12 subsequently reweaves in the existing node in the DAG 20, in accordance with the downstream tasks identified.

In some embodiments, a specific procedure may be implemented to detect potential orphan tasks. Tasks having inputs and outputs that are not connected to any other tasks of the DAG 20 can be considered as orphans. By definition, orphan tasks will not be executed via the OI 12 and the data they produce will not be consumed by any other tasks in the DAG 20. Thus, because there is, a priori, no reason to encode orphan tasks in the DAG 20, the OI 12 reports the detected orphan task to the TMS 11.

For cases in which a task is to be deleted as per the update information received, the OI 12 may first attempt to identify any dependent task (FIG. 4, steps S42 and S44), which is downstream of the task to be deleted, (i.e., tasks receiving inputs from the task to be deleted). The dependent task determination is performed by assessing outputs of the task to be deleted. Subsequent to determining there are no downstream dependent tasks, the OI 12 can safely delete the node corresponding to the task to be deleted (step S46 and step S44: No Branch). If a downstream dependency is identified for the task requested for deletion, the OI 12 will typically notify the TMS 11 (step S48), with a focus on remedying the faulty request.

The above discussion considers three types of events to be handled by the interface OI 12, which include task creations, task updates, and task deletions. However, only one or two types of events may possibly be needed, depending on the actual application. For example, some applications may only tolerate updates to existing tasks, or task creations. In some embodiments, additional types of events may be considered, which events may for example impact the conditions in which some of the tasks are to be executed.

The following discussion focuses on interactions between the OI 12 and the TES 13 to orchestrate the execution of the tasks, in reference to FIG. 6. As explained earlier, the OI 12 explores (i.e., traverses) the DAG 20 to iteratively identify the tasks that depend on already completed tasks (FIG. 6, step S153, as per the runtime dependencies). The OI 12 can instruct the TES 13 to execute the dependent tasks identified (step S157). During this iterative process, the OI 12 may advantageously determine, or update runtime configurations of the dependent tasks identified (step S155). Thus, the TES 13 may subsequently be instructed by the OI 12 to execute the dependent tasks in accordance with the runtime configurations determined or updated by the OI 12 (step S157). The OI 12 may update the runtime configurations gradually, depending on several factors, such as statuses of execution of the tasks, settings, and constraints.

The runtime configurations determined by the OI 12 allow optimized executions to be performed at the TES 13. Each runtime configuration includes a set of parameters affecting the schedule and the allocated resources. Such parameters can notably reflect, or capture, quotas of computational resources dedicated to given sets of tasks in a cloud environment. In addition, the runtime configurations may govern the extent to which certain tasks can be parallelized and determine the resources needed for parallelization. The runtime configurations may also determine the number of task instances that are allowed to run in parallel. The runtime configurations may further govern parameters of pipelines of tasks, notably for applications involving linear optimization or reinforcement learning. In general, such runtime configurations are subject to constraints, for example in terms of quotas. Thus, the runtime configurations determined by the OI 12 must obey such constraints. Nevertheless, the runtime configurations determined by the OI 12 will generally exploit all the flexibility allowed by such constraints for optimization purposes. Typically, the runtime configurations bind variable values and program settings when the program is running, which can be achieved by updating the relevant configuration files using a just-in-time approach, for example.

The OI 12 interacts with the TES 13 by exchanging messages. For example, the OI 12 may receive status messages from the TES 13 (FIG. 6, step S120), as well as from other entities, such as the TMS 11, in which the messages received concern the execution of the tasks. In practice, the TES 13 may continually send status messages to the OI 12 (FIG. 5, step S240) as well as other entities. Some of the messages received from the TES 13 may include statuses of execution (e.g., task completed, task completion failed) of the tasks that have been previously instructed by the OI 12 to be executed at the TES 13.

In practice, the OI may maintain and encode additional status information (e.g., "task submitted for execution" and/or "task running"), in which the status information may reflect messages sent by the TES 13, or not. For example, the OI may update the status of a given node from "task pending," which may be a default status and, therefore, omitted, to "task submitted" right after instructing the TES 13 to execute this task, without necessarily waiting for a corresponding message from the TES.

Subsequent to receiving a message from the TES 13 (or other interested party), the OI 12 may update one or more attributes of the corresponding nodes of the DAG 20 (FIG. 6, step S152), in accordance with statuses of tasks included in the message. Based on the updated attributes, the dependent tasks are iteratively identified (step S153). In some embodiments, the OI 12 may receive messages from the TES 13 about the execution status or failure of execution of some of the tasks and then aggregate corresponding data statuses in corresponding nodes of the DAG 20.

For example, a status message received at step S120 may include an execution report that indicates that a respective task was successfully completed. The report concerns an already executed task, which the OI 12 has previously instructed the TES 13 to execute. Subsequent to receiving such a report, the OI 12 identifies a given node of the DAG 20 that corresponds to said task (step S151), as seen in FIG. 6. The OI 12 identifies all the nodes that are downstream of the identified, previously executed task, based on the connected edges. The dependent tasks correspond to the downstream nodes identified. In some embodiments, the OI 12 may update runtime configurations of the dependent tasks identified (FIG. 6, step S155). The OI 12 identifies the node corresponding to the completed task, for any task completed, according to the corresponding report received from the TES 13, as well as all downstream dependent nodes, and then updates the runtime configurations of executions of the downstream tasks in accordance with the completed task. A task, ready for execution, is instructed by the OI 12 to be executed by the TES 13 (step S157), in accordance with the runtime configurations determined or updated.

The iterative process S150 discussed so far concerns steps performed in response to tasks already executed, in which the OI 12 explores (i.e., traverses) the DAG 20 downwards to update runtime configurations (step S155) and, where possible, provides instruction to execute the tasks that are ready for execution (step S157). A top-down approach is used to identify and execute dependent tasks. However, as further seen in FIG. 6, a bottoms-up process may concurrently be implemented (step S160), to handle requests to execute tasks, including the requests received from the TMS 11. The OI 12 explores (i.e., traverses) the DAG 20 to determine tasks that are upstream of tasks that are requested to be started by the TMS 11. Subsequent to receiving a request to start a given task, the OI 12 attempts to identify a corresponding node in the DAG 20 (steps S161 and S163), as well as all upstream nodes, in accordance with edges of the DAG 20 that connect to the corresponding node. If no upstream node is identified, at step S162, the OI 12 can immediately instruct the TES 13 to execute the given task (step S164).

The bottoms-up process step S160 determines or updates the runtime configurations of executions of all upstream tasks corresponding to the upstream nodes identified (step S165). Tasks found to be ready for execution can be instructed by the OI 12 to be executed by the TES 13 (step S167), in accordance with the runtime configurations as determined or updated for this task.

The "update upstream nodes" process, shown in step S160 of FIG. 6, may cause the OI 12 to identify all upstream nodes, possibly up to the root node, by traversing the DAG 20. Once a topmost task is identified in the DAG 20, the status of which indicates that is has already been executed, the OI 12 can iteratively instruct the TES 13 to execute the dependent tasks (step S167), using a top-down process similar to the process described earlier in reference to the process step S150.

Process step S140 is triggered when the OI 12 receives a message indicating that the execution of a task failed. In the case of a failed task execution, the OI 12 identifies the corresponding node (step S141), updates the status of the node (step S142), and informs the TMS 11 regarding the status (step S146), for the purpose of remedying the situation. The TMS 11 may inform a user regarding the status of the identified task.

An example of the application of the orchestration interface is now discussed in reference to FIG. 2, which depicts tasks Tij managed by the TMS 11. The OI 12 accordingly builds nodes mapping the tasks managed by the TMS 11. The references Pij in the nodes refer to processes corresponding to the tasks, while dependencies Dij are captured as edges linking the nodes. By interacting with the TES 13, the OI 12 instructs the TES 13 to execute jobs Jij corresponding to the tasks.

Continuing the example, a given task is assumed to be updated, such as task T12 in FIG. 2. The contour outline of the corresponding task is dashed, as are the corresponding nodes P12 in the DAG 20, managed by the OI 12, and the corresponding job J12 at the TES 13. The TMS 11 sends an update message to the OI 12, which checks for potential duplicated outputs before identifying all upstream nodes and downstream nodes connected to the node P12. If no inconsistency is detected in terms of outputs and inputs, the OI 12 re-weaves in the node P12. When the TMS 11 requests to execute the task T12, the OI 12 checks the current statuses of the nodes Pij, in particular the statuses of upstream nodes. In this example, the nodes corresponding to tasks that are assumed to have already been executed have dotted contours (namely nodes P00, P01, P02, and P11), as does the jobs J00, J01, J02, and J11. Given the sole upstream dependency, edge D12 applying to P12, and the statuses of the upstream node P02 (already executed), P12 is ready for execution. The OI 12 instructs the TES 13 to start execution of a corresponding job J12. Subsequent to executing job J12, the TES 13 informs the OI 12 about the completion of execution, and the OI 12 checks the downstream nodes and accordingly updates the runtime configurations of the downstream nodes. For instance, as per the runtime configurations, the tasks corresponding to {P20, P30}, {P21, P31}, and {P22, P32}, may execute in parallel, with other conditions permitting.

Another aspect of the invention concerns a computerized system 1 for automatically orchestrating a computerized workflow. As seen in FIG. 1, the system 1 comprises a first interface means 121, a reception module 122, a topological analysis module 123, an orchestration module 124, and second interface means 125. The units 121-125 form an orchestration interface (00, comprising in part OI 12, as described earlier in reference to the present methods. In embodiments, however, the system 1 further comprises the TMS 11 and/or the TES 13. In the example of FIG. 1, the system 1 includes the TMS 11, the OI 12, and the TES 13. In some embodiments, the modules 122, 123, and 124, are implemented by software.

Figure 7:
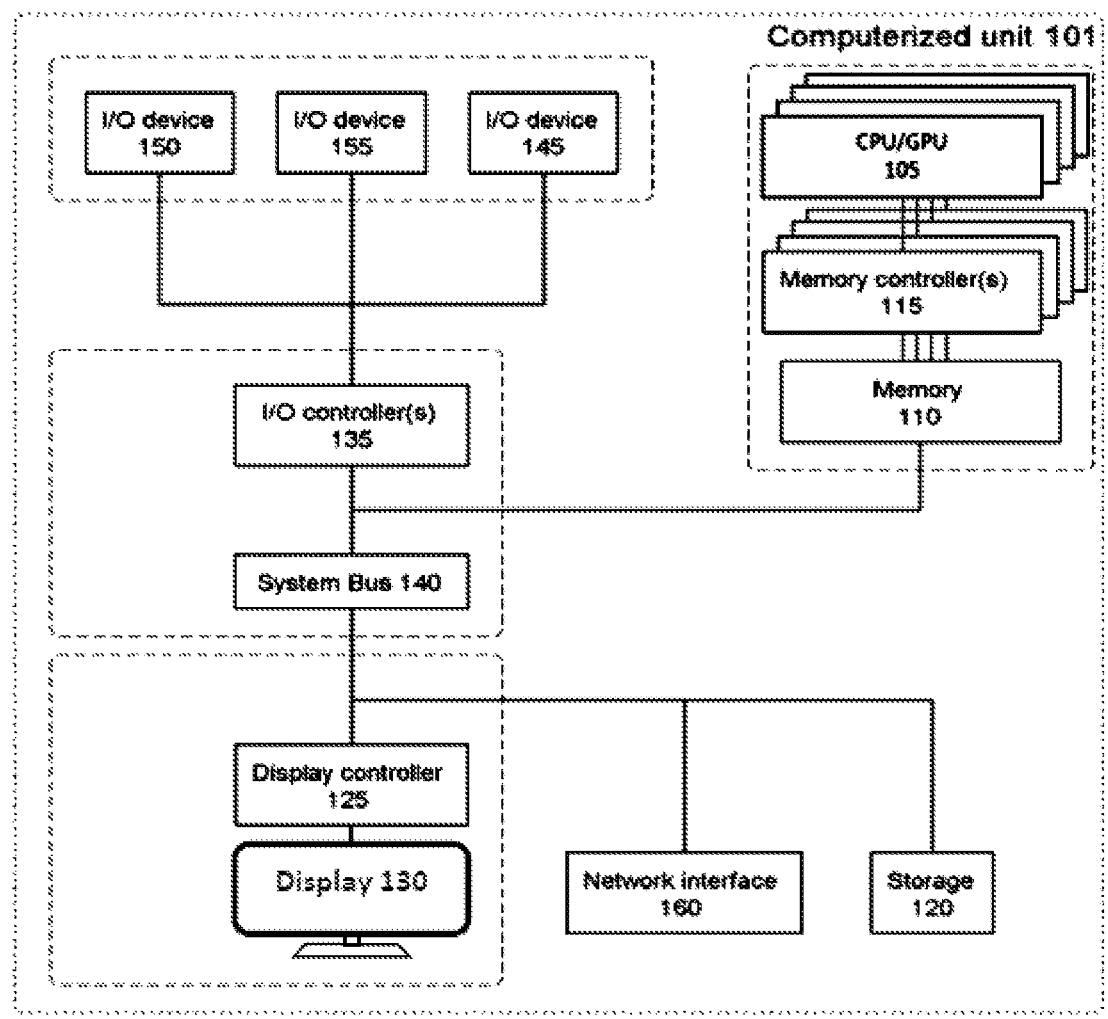
FIG. 7 depicts a schematic representation of a general-purpose computerized unit, capable of implementing the method steps of embodiments of the present invention.

The first interface means 121 of the OI 12 can be interfaced with the TMS 11 for communication, such as an exchange of messages with the TMS 11. Similarly, the second interface means 125 of the OI 12 can be interfaced with the TES 13. The components 11, 12, and 13 typically interact via a communication network, notwithstanding the depiction of FIG. 1. Various protocols can be used for interface communication purposes, such as a connection-oriented protocol, TCP protocols and other protocols working on top of TCP. In particular, the TMS 11, the OI 12, and the TES 13, can be implemented in separate units 101 such as shown in FIG. 7, where such units are equipped with network interfaces. More generally, the system 1 (including the OI 12 and, possibly, the TMS 11 and/or the TES 13) can be implemented as one or more computerized units 101 such as shown in FIG. 7. In particular, the TES 13 may be part of, or form part of a cloud platform. The computerized unit 101 is discussed in detail in section 3.1.

The system 1 further comprises a reception module 122, which is configured to receive update information via the first interface means 121. In operation, the update information captures changes to a workflow of tasks managed by the TMS 11. As explained earlier in reference to the present methods, this workflow is defined by processes of the tasks, inputs to the tasks, and outputs from the tasks. The inputs and outputs determine runtime dependencies between the tasks.

The topological analysis module 123 is configured to obtain and populate a topology of nodes and edges as a DAG 20. In operation, the topological analysis module 123 determines the topology based on update information received via the reception module 122. As explained earlier, the nodes are mapped onto the tasks managed by the TMS 11, while the edges capture the runtime dependencies between the tasks, as per the inputs to and outputs from the tasks.

The orchestration module 124 is configured to orchestrate the execution of the tasks. To accomplish the execution of the tasks, the orchestration module interacts with the TES 13 via the second interface means 124, such as by exchanging messages with the TES 13. In operation, the orchestration module 124 iteratively identifies dependent tasks, by exploring the DAG 20. The dependent tasks are tasks that depend on already completed tasks (as per the runtime dependencies), as illustrated in FIG. 2. In turn, the orchestration module 124 instructs the TES 13 to execute the identified dependent tasks. As explained earlier in reference to FIG. 6, the orchestration module 124 may concurrently operate a tops-down process (step S150) and a bottoms-up process (step S160), during which the orchestration module 124 suitably determines or updates runtime configurations, so as to jointly manage task execution requests coming from the TMS 11 and execution status reports coming from the TES 13.

Another aspect of the invention concerns a computer program product for automatically orchestrating a computerized workflow. The computer program product comprises a computer readable storage medium having program instructions embodied therewith. The program instructions can, for instance, be executed by processing means 105 of a personal computer, a server, or nodes of a cloud computing platform, to cause such processing means to perform steps of methods described herein, notably the steps shown in FIGS. 4 and 6, and in some embodiments, the steps shown in FIGS. 3 and 5 as well, should the underlying computer system 1 implement the TMS 11 and the TES 13. Such methods may be executed in a delocalized fashion, across several computerized units 101, if necessary, where such units typically communicate over a communication network. This aspect is further discussed in section 3.2.

The above embodiments have been succinctly described in reference to the accompanying drawings and may accommodate a number of variants. Several combinations of the above features may be contemplated. Examples are given in the next section.

2. EXEMPLARY EMBODIMENTS

2.1 Particular Example Embodiments

In particular example embodiments, the OI 12 dynamically handles a DAG 20, such that the nodes represent tasks, the edges capture runtime dependencies between the tasks, and the OI 12 aggregates execution statuses of the individual tasks, in response to messages received from the TES 13. The OI 12 does not include the code embodying the tasks. Rather, the OI 12 sends messages to the TES 13 to instruct the latter to start executing the tasks and handles messages from the TES 13 about successful completions of execution or errors of execution of the tasks. The TES 13 independently accesses all resources necessary to execute the jobs corresponding to the tasks. The OI 12 receives update information from the TMS 11. Such messages concern changes (i.e., updates) to individual nodes, whether concerning the processes or the dependencies between the nodes.

The OI 12 is preferably configured to enable a fully automated orchestration of tasks and further helps identify and prevent changes which can break the orchestration logic (i.e., consistency).

The OI 12 automatically builds the DAG 20 using information about dependencies between tasks, and automatically propagates changes in the task dependencies to the DAG 20. The OI 12 relies on data provided by the TES 13 (i.e., tasks ID, status ID, timestamps, history to estimate timing of future tasks, etc.), as well as data provided by the TMS 11 (i.e., upstream task IDs, data about changed nodes, including IDs and related events). The OI 12 runs processes to detects orphan tasks whose execution cycle is not connected to another task.

The OI 12 is further configured to perform an automated consistency check and prevent concurrent writes to the same locations (i.e., illegal duplications). In addition, the OI 12 consolidates information about current and planned workloads, which can be used for different types of optimizations and capacity planning. The current and planned workload information can be used to improve resource management in hybrid cloud environments, for example. The OI 12 can notably be used to simplify the orchestration of interdependent tasks in cloud environments.

2.2 Exemplary Flows

Figure 3:
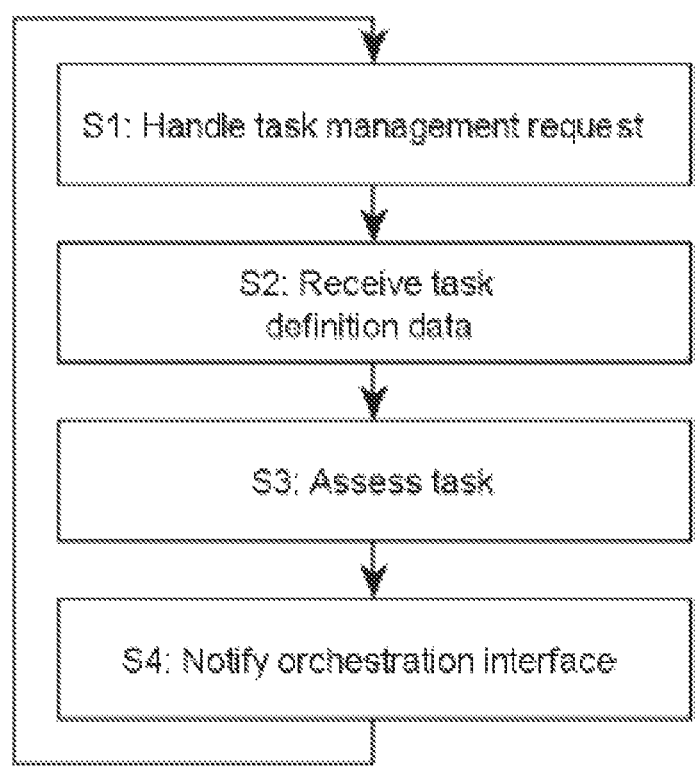
FIG. 3 is a flowchart illustrating high-level steps of a method of automatically orchestrating a computerized workflow, in accordance with an embodiment of the present invention.

FIG. 3 shows an example flow of operations performed at the TMS 11. The TMS 11 receives a request to handle the management of a task at step S1, for example, from a user interacting with the TMS 11. The user sends task definition data, which are received at the TMS 11 at step S2. At step S3, the TMS 11 assesses the task to check attributes of the task (i.e., process definition, inputs, outputs). Automated rules may be used to check the consistency of the task definition. If the task definition is correct, the TMS notifies the OI 12 at step S4. This process is repeatedly implemented each time a new user request is received at step S1. In addition, the TMS 11 may receive messages from the OI 12 and the TES 13 (not shown).

The messages sent by the TMS 11 trigger processes at the OI 12, which are now described in reference to FIG. 4. The latter shows a preferred flow of interactions between the TMS 11 and the OI 12. The overall process starts at step S10, during which the OI 12 synchronizes with the TMS 11. At step S20, the TMS 11 sends an event message to the OI 12. At step S30, the OI 12 uses a conditional step to determine whether the event relates to a task creation, a task update, or a task deletion request.

If a task deletion is requested, then a specific process, step S40, is triggered, at which the OI 12 identifies the downstream nodes of the node corresponding to the task to be deleted (step S42). If such a node is found (step S44: Yes branch), the OI 12 sends an error notification to the TMS 11 (step S48), because a non-leaf node should a priori not be deleted. If no such downstream node is found (step S44: No branch), the OI 12 can safely delete the node corresponding to the task to be deleted (step S46).

If a task update is requested (step S50), a corresponding process is started, in which the OI 12 first checks for potential, illegal duplicated outputs (step S51) and sends an error notification to the TMS 11 (step S52) if any such outputs are found (S51: Yes). If illegal duplicate outputs are not found, the OI 12 identifies the node corresponding to the task to be updated in the DAG (step S53), and then identifies any connected node (step S54), whether upstream or downstream. If a connected node is not found (step S55: No branch), the OI 12 informs the TMS (step S57), which may proceed to a verification. If a connected node is found, (S55: Yes branch), the OI 12 re-weaves in the identified node with the connected nodes (step S58), taking account of all impacted inputs and outputs.

If a task creation is requested, a creation process is started (step S60), in which the OI 12 checks for potential, illegal duplicated outputs (step S61). The OI 12 sends an error notification to the TMS 11 (step S62) if any such duplicated outputs are found (step S61: Yes branch). If duplicated outputs are not found, the OI 12 attempts to identify upstream nodes (step S63). If no upstream node is found (step S64: No branch), the OI 12 informs the TMS 11 (step S65), which may then proceed to a verification, if necessary. If upstream node(s) are found (step S64: Yes branch), the OI 12 creates a new node (step S66), and weaves in the created node with the upstream nodes (step S67). The OI 12 does not need to attempt to identify upstream nodes of the very first task to be encoded in the DAG 20 (step S63) and, similarly, the OI 12 does not need to inform the TMS 11 about any missing dependency.

Figure 5:
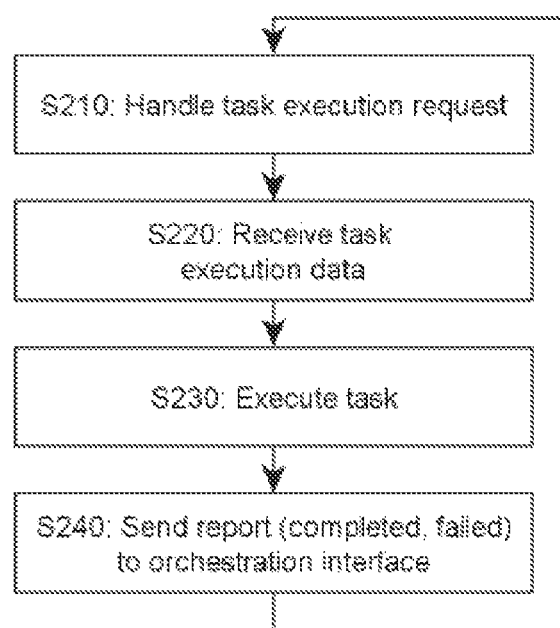
FIG. 5 depicts steps performed at the task execution system (TES), in accordance with an embodiment of the present invention.

FIG. 5 shows a preferred flow of operations performed at the TES 13. The TES receives a request to handle the execution of a task at step S210, from the OI 12. At step S220, the TES receives all data necessary for the task execution, starting with the runtime configuration parameters. The OI 12 typically does not need to forward the corresponding code of the task execution. The OI 12 may transmit a task ID, a link to the code, or an address of the code to be executed. The TES 13 accordingly executes the task at step S230 and subsequently, in step S240, sends an execution report to the OI 12, such as a message informing about the execution status of the task (e.g., completed or failed). The process is repeatedly implemented each time a new OI 12 request is received at step S210.

The messages exchanged between the OI 12 and the TES 13 allow the OI 12 to orchestrate executions of the tasks, as now described in reference to FIG. 6. The overall process starts at step S110, during which the OI 12 synchronizes with the TES 13 and the TMS 11. At step S120, the OI 12 receives an event (i.e., a message) from the TES 13 or the TMS 11. At step S130, the OI 12 determines whether the event concerns a task to be started (the "start" event is typically sent from the TMS 11), or whether the event is an execution report (normally sent from the TES 13), informing whether a task has successfully completed or failed.

If the event received at step S120 is determined to be a request to start a task (step S130), the OI 12 starts a process to update the corresponding upstream nodes (step S160). The OI 12 identifies the node corresponding to the task to be started (step S161). Subsequently, the OI 12 determines whether any upstream node exist (step S162), as per the DAG 20, and, if so, retrieves the upstream nodes (step S163). Identifying upstream nodes, the OI 12 defines or updates runtime configurations for the tasks corresponding to the upstream nodes identified (step S165). the OI sends an execution request to the TES 13 (step S167), with respect to each upstream task that is ready for execution, the runtime dependencies and statuses of execution of the upstream tasks permitting. If no upstream can be identified at step S162, then the OI 12 can safely instruct the TES 13 to execute the task (step S164). Each time, the task is meant to be executed in accordance with the runtime configuration determined (or last updated) by the OI 12.

If the event received at step S120 is determined to be a message informing about the successful completion of a task (step S130; the message typically comes from the TES 13), the OI 12 starts a process to update the corresponding downstream nodes (step S150). The OI 12 identifies the node corresponding to the task completed and then sets the status of this node to "completed". Subsequent to setting the "completed" status, the OI 12 retrieves the downstream nodes. The OI 12 may define, or update runtime configuration parameters of the downstream nodes identified (step S155). At step S157, the OI 12 sends an execution request to the TES 13 to start execution of each of the downstream nodes that are ready for execution as per the runtime dependencies and statuses of execution of all of the corresponding upstream tasks.

If the event received at step S120 is determined to be a message informing about the unsuccessful completion of a task (this message normally comes from the TES 13), then the OI 12 starts a process (step S140) in which the OI 12 identifies the node corresponding to the task that failed (step S141), sets the status of the node to 'failed' (step S142), and sends a notification to the TMS 11 and/or a user having stakes in the corresponding task (step S146).

3. TECHNICAL IMPLEMENTATION DETAILS

3.1 Computerized Units

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention may involve virtual machines and/or general-purpose digital computers, such as personal computers, workstations, etc., are used.

For instance, the computerized system 1 shown in FIG. 1 and FIG. 2 may comprise one or more computerized units 101 (e.g., general- or specific-purpose computers), such as shown in FIG. 7. Each unit 101 may interact with other similar units 101 to perform steps according to the present methods.

In exemplary embodiments, in terms of hardware architecture, as shown in FIG. 7, each unit 101 includes at least one processor 105, and a memory 110 coupled to a memory controller 115. Several processors (CPUs, and/or GPUs) may possibly be involved in each unit 101. To that aim, each CPU/GPU may be assigned a respective memory controller, as known per se.

One or more input and/or output (I/O) devices 145, 150, 155 (or peripherals) are communicatively coupled via a local input/output controller 135. The I/O controller 135 can be coupled to or include one or more buses and a system bus 140, as known in the art. The I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software, including instructions such as coming as part of computerized tasks triggered by machine learning algorithms. The processors 105 can be any custom made or commercially available processor(s). In general, they may involve any type of semiconductor-based microprocessor (in the form of a microchip or chip set), or more generally any device for executing software instructions, including quantum processing devices.

The memory 110 typically includes volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 7, instructions loaded in the memory 110 may include instructions arising from the execution of the computerized methods described herein in accordance with exemplary embodiments. The memory 110 may further load a suitable operating system (OS) 111. The OS 111 essentially controls the execution of other computer programs or instructions and provides scheduling, I/O control, file and data management, memory management, and communication control and related services.

Possibly, a conventional keyboard and mouse can be coupled to the input/output controller 135. Other I/O devices 140-155 may be included. The computerized unit 101 can further include a display controller 125 coupled to a display 130. The computerized unit 101 may also include a network interface or transceiver 160 for coupling to a network (not shown), to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wi-Fi, WiMAX, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Embodiments benefit from networks providing very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

3.2 Computer Program Products

The present invention may be a method, a computerized system, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Go, Python, Ruby, Scala, Swift, Java, Go, Python, Ruby, Scala, Swift, etc., and procedural programming languages, such as the C programming language or other programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of automatically orchestrating a computerized workflow with an orchestration interface, the method comprising:
    receiving, by one or more processors, update information of a workflow from a task manager system (TMS), wherein the update information is applied to a previous state of the workflow, which is managed by the TMS, and wherein the workflow is defined by a set of tasks, inputs to the tasks, and outputs from the tasks, and wherein said inputs and outputs determine runtime dependencies between the tasks;
    populating, by the one or more processors, a topology of nodes and edges as a directed acyclic graph (DAG), wherein the nodes are mapped to the workflow tasks managed by the TMS and the edges capture the runtime dependencies between the tasks, as per said inputs to the tasks and outputs from the tasks;
    identifying, by the one or more processors, a dependent task that depends on a completed task as per said runtime dependencies, based on traversing the nodes and edges of the DAG; and
    orchestrating, by the one or more processors, the execution of the dependent task by interacting with a task execution system (TES) and instructing the TES to execute the dependent task that depends on the completed task identified by traversing the DAG.

2. The method according to claim 1, wherein
    populating, by the one or more processors, the topology comprises weaving in a new node in the DAG in which the new node corresponds to a new task to be created as per the update information received.

3. The method according to claim 1, wherein
    populating, by the one or more processors, the topology comprises re-weaving in an existing node in the DAG in which the existing node corresponds to an existing task to be updated as per the update information received.

4. The method according to claim 1, wherein
    populating, by the one or more processors, the topology comprises deleting a node from the DAG in which the deleted node corresponds to an existing task to be deleted as per the update information received.

5. The method according to claim 1, wherein populating the topology further comprises:
    checking, by the one or more processors, the runtime dependencies of tasks to be modified based on inputs to the tasks and outputs from the tasks to detect potential inconsistencies in the runtime dependencies.

6. The method according to claim 5, wherein checking the runtime dependencies further comprises:
    checking, by the one or more processors, for duplicated outputs of a new task to be created or an existing task to be updated, based on inputs to the tasks and output from the tasks of the workflow as per said update information and by traversing the topology of the DAG.

7. The method according to claim 5, wherein populating the topology further comprises:
    notifying, by the one or more processors, the TMS upon detecting an inconsistency in the runtime dependencies checked.

8. The method according to claim 1, wherein populating the topology for a new task to be created as per the update information received, further comprises:
    identifying, by the one or more processors, for said new task, one or more upstream tasks, on which said new task depends, by assessing inputs to said new task based on traversing the DAG that is updated per the update information received; and weaving in a new node, corresponding to said new task, in the DAG, in accordance with outputs from the one or more upstream tasks identified.

9. The method according to claim 1, wherein populating the topology includes, for an existing task to be updated as per the update information received:

identifying, by the one or more processors, one or more upstream tasks, on which said existing task depends, by assessing inputs to said existing task, and reweaving in an existing node of the DAG that corresponds to said existing task, in accordance with the one or more upstream tasks identified; and identifying, by the one or more processors, one or more downstream tasks, which depend on said existing task to be updated, by assessing outputs from said existing task and reweaving in an existing node of the DAG that corresponds to said existing task in accordance with the one of more downstream tasks identified.

10. The method according to claim 1, wherein populating the topology further comprises:

determining, by the one or more processors, an existing task indicated for deletion as per the update information received;

determining, by the one or more processors, an absence of a downstream task that depends on said existing task indicated for deletion, by assessing outputs of said existing task to be deleted; and deleting, by the one or more processors, a node of the DAG corresponding to said existing task to be deleted.

11. The method according to claim 1, wherein orchestrating the execution of the tasks at the orchestration interface, further comprises:

iteratively determining, by the one or more processors, at the orchestration interface, runtime configurations of the dependent task identified, whereby the TES is subsequently instructed to execute the dependent task in accordance with the runtime configurations determined at the orchestration interface.

12. The method according to claim 1, wherein orchestrating the execution of the tasks at the orchestration interface, further comprises:

receiving, by the one or more processors, status messages from the TES, the status messages including a status of execution of the task instructed to be performed at the TES; and updating, by the one or more processors, attributes of the node of the DAG in accordance with said status, whereby the dependent task is identified based on the updated attributes.

13. The method according to claim 12, wherein the dependent task is iteratively identified by:

identifying, by the one or more processors, a given node of the DAG that corresponds to a respective task successfully completed, based on the status messages received; and identifying, by the one or more processors, downstream nodes of said given node, based on edges connecting said given node to the identified downstream nodes.

14. The method according to claim 13, wherein the runtime configurations of the dependent tasks identified are determined by:

iteratively updating, by the one or more processors, runtime configurations of the dependent tasks corresponding to the downstream nodes identified.

15. The method according to claim 13, wherein the runtime configurations of the dependent task identified further comprises:

identifying, by the one or more processors, a node in the DAG corresponding to a task requested to be started, and all upstream nodes; and updating, by the one or more processors, the runtime configurations of the executions of all upstream tasks corresponding to the upstream nodes identified based on the edges of the DAG connected to the task requested to be started.

16. The method according to claim 1, further comprising:
continually sending, by the one or more processors, update information from the TMS to the orchestration interface.

17. The method according to claim 1, further comprising:
continually sending, by the one or more processors, status messages from the TES to the orchestration interface, including statuses of execution of the tasks instructed to be performed at the TES.

18. A computerized system for automatically orchestrating a computerized workflow, the system comprising:

one or more computer processors;
at least one computer-readable storage medium;
program instructions stored on the at least one computer-readable storage medium, the computer system comprising:
  a first interface means interfaceable with a task manager system (TMS);
  a reception module configured to receive update information via the first interface means, wherein, in operation, the update information includes changes to a workflow of tasks managed by the TMS, and the workflow is defined by processes associated with inputs to the tasks, and outputs from the tasks, and said inputs and outputs determine runtime dependencies between the tasks:
  a topological analysis module configured to determine and populate, a topology of nodes and edges as a directed acyclic graph (DAG), based on the update information received, wherein the nodes are mapped to correspond with the tasks managed by the TMS and the edges capture the runtime dependencies between the tasks, as per said inputs and outputs:
  a second interface means interfaceable with a task execution system (TES); and
  an orchestration module configured to orchestrate the execution of the tasks by interacting with the TES via the second interface means, iteratively identifying dependent tasks of completed tasks as per said runtime dependencies and instructing the TES to execute the dependent tasks identified.

19. The computerized system according to claim 18, wherein the orchestration module includes the first interface means and the second interface means.

20. A computer program product for automatically orchestrating a computerized workflow, the computer program product comprising: instructions executable by processing means to cause the latter to:

at least one computer readable storage medium and program instructions stored on the at least one computer readable storage medium, the program instructions comprising:
  program instructions to access update information of a workflow received from a task manager system (TMS), wherein the update information captures changes to the workflow of tasks managed by the TMS, and wherein the workflow is defined by processes of a set of tasks, inputs to the tasks, and outputs from the tasks; and said inputs and outputs determine runtime dependencies between the tasks;

program instructions to populate a topology of nodes and edges as a directed acyclic graph (DAG), wherein the nodes are mapped to the workflow tasks managed by the TMS and the edges capture the runtime dependencies between the tasks, as per said inputs to the tasks and outputs from the tasks;

program instructions to identify a dependent task that depends on a completed task as per said runtime dependencies, based on traversing the nodes and edges of the DAG; and orchestrate the execution of the task by interacting with a task execution system (TES) and instructing the TES to execute the dependent tasks that depends on the completed task identified by traversing the DAG.

* * * * *